W. S. STAPLEY.
GREASE GUN.
APPLICATION FILED SEPT. 26, 1908.
915,499.  Patented Mar. 16, 1909.
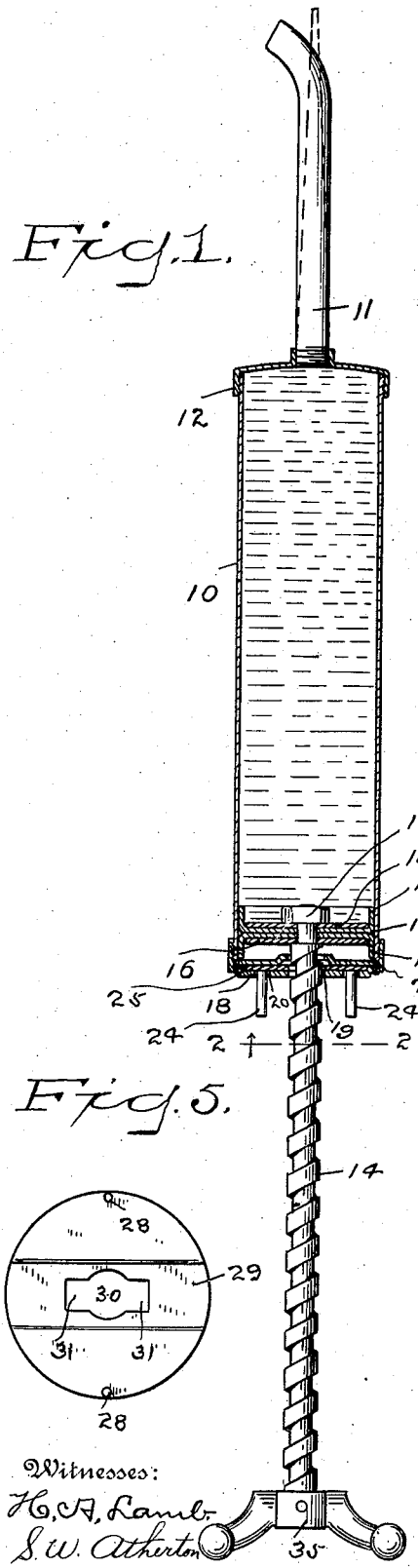
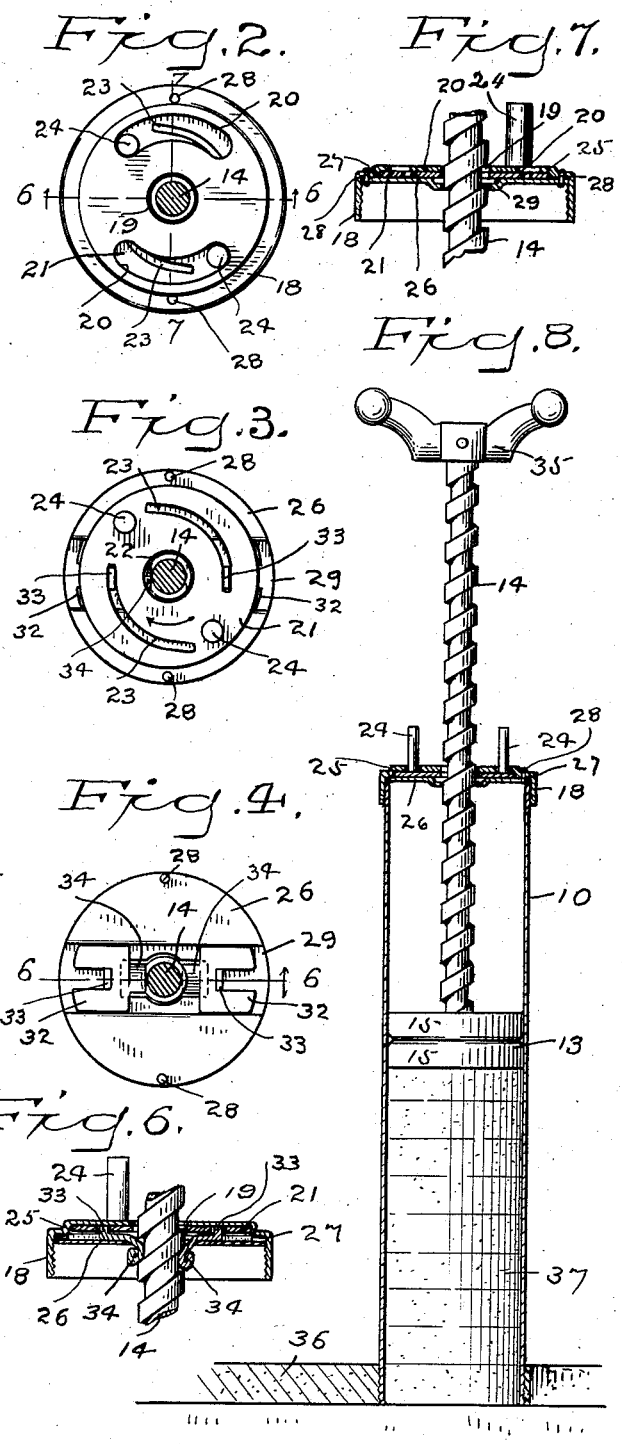
Witnesses:
H. A. Lamb
S. W. Atherton
Inventor
William S. Stapley
By Attorney
N. M. Wooster

UNITED STATES PATENT OFFICE.

WILLIAM S. STAPLEY, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

GREASE-GUN.

No. 915,499.  Specification of Letters Patent.  Patented March 16, 1909.

Application filed September 26, 1908. Serial No. 454,905.

*To all whom it may concern:*

Be it known that I, WILLIAM S. STAPLEY, a citizen of the United States, residing at Bridgeport, county of Fairfield, State of Connecticut, have invented a new and useful Grease-Gun, of which the following is a specification.

This invention has for its object to provide a grease-gun, so called, which shall be adapted for use with either hard or soft grease or oil, which will eject the grease by means of a screw-actuated piston and which shall be so constructed that when the piston reaches the extreme of its inward movement the screw will be automatically disconnected so that the piston may be retracted by longitudinal movement of the screw and when used with hard grease the piston will be raised by the cakes of grease as they are cut out by the end of the cylinder.

With these and other objects in view I have devised the novel grease gun of which the following description in connection with the accompanying drawing is a specification, reference characters being used to indicate the several parts.

Figure 1 is a view partly in elevation and partly in longitudinal section, illustrating my novel grease gun with the piston retracted and the cylinder filled with soft grease or oil; Fig. 2 a rear end view of the cylinder with the screw in section on the line 2—2 in Fig. 1, looking in the direction of the arrow; Fig. 3 a similar view with the cap removed, the cam disk appearing in plan; Fig. 4 a similar view with the cam disk removed, the carrying plate, slides and dogs appearing in plan; Fig. 5 a plan view of the carrying plate detached; Fig. 6 a section of the cap, cam disk, carrying plate and dogs on the line 6—6 in Figs. 2 and 4; Fig. 7 a section on the line 7—7 in Fig. 2; and Fig. 8 is a view partly in elevation and partly in section, illustrating the operation of loading the cylinder with hard grease.

10 denotes the cylinder which is provided with a suitable nozzle 11 which may be either curved or straight as indicated respectively by full and dotted lines in Fig. 1. In order to adapt the gun for use with hard grease, the outer or discharge end of the cylinder is provided with a removable cap, indicated by 12, to which the nozzles are removably secured.

13 denotes the piston which is pivotally secured to a screw 14. In order to prevent the possibility of leakage and to insure effectiveness in use, I preferably use a piston comprising reversed cup-shaped flexible washers 15 and inner and outer metallic washers 16 which are retained on the end of a screw by means of a nut 17, leaving the screw free to rotate independently of the piston. At the base or inner end of the cylinder is a cap 18 having a central opening 19 through which the screw passes freely and arc-shaped slots 20.

21 denotes an oscillatory cam disk which lies in a recess 25 in the cap in which it rotates freely, is provided with a central opening 22 through which the screw passes freely, with cam slots 23 and with operating pins 24 which extend through the arc-shaped slots in the cap.

26 denotes a retaining plate which engages the shoulder 27 in the base of the cap outside recess 25 and is secured to the cap as by rivets 28. The retaining plate is provided with a transverse groove 29, with a central opening 30 and with slots 31 in alinement with the groove which lead into the central opening.

32 denotes slides which are adapted to reciprocate in groove 29 and are provided with lugs 33 which engage cam slots 23 in the cam disk and with dogs 34 which lie in slots 31 in the retaining plate and engage the thread of the screw, as clearly shown in Fig. 6. Both the lugs and the dogs may be struck out and formed from the metal of the slides, as clearly shown.

35 denotes a cross piece at the outer end of the screw for convenience in operation and to engage operating pins 24 on the cam disk to oscillate the latter and draw the dogs out of engagement with the thread of the screw when the piston is at the extreme of its forward movement.

The operation is as follows: Suppose the gun to be loaded with oil or soft grease, as in Fig. 1, and the dogs to be in engagement with the thread of the screw. Forward rotation of the screw by means of the cross piece will force the piston forward and cause the grease to be discharged from the nozzle. When the screw has been turned entirely in and the piston is at the forward end of the cylinder, the cross piece will engage the operating pins and pressure upon the cross piece will move the pins backward in the arc-slots in the cap, thereby oscillating the cam disk and withdrawing the dogs from engagement with the thread of the screw through the engagement of lugs 33 with the cam slots in the disk. This leaves the screw wholly free so that it will act as an ordinary piston rod and the piston may be drawn backward by a longitudinal movement of the screw. The gun is loaded with oil or soft grease by simply inserting the nozzle into oil or grease in a receptacle and drawing the piston backward in the same manner that a piston syringe is filled. When the cylinder is partly or wholly filled with oil or soft grease, to discharge the grease the operator oscillates the cam disk by pressure on the operating pins and places the dogs in engagement with the thread of the screw. The oil or grease may then be forced out by forward rotation of the screw by means of the cross piece until the cylinder is emptied and the dogs are again withdrawn by the cross piece from engagement with the thread of the screw.

To fill the cylinder with hard grease, the operator removes cap 12 from the discharge end of the cylinder and presses the open end of the cylinder into the grease, which is indicated by 36 in Fig. 8, the end of the cylinder acting to cut out cakes of the grease, which are indicated by 37. As each cake is cut out it lifts the cakes previously cut out and the piston upward in the cylinder, as clearly shown in Fig. 8. The operation in discharging hard grease is the same as in discharging soft grease or oil. The dogs are moved into engagement with the thread of the screw and, cap 12 and the nozzle being in place, the grease is discharged through the nozzle by forward rotation of the screw.

Having thus described my invention I claim:

1. A grease gun comprising a cylinder, a piston, a screw by which the piston is carried, dogs adapted to engage the thread of the screw, slides by which the dogs are carried, a retaining plate having a transverse groove in which the slides reciprocate and an oscillatory cam disk by which the slides are operated.

2. A grease gun comprising a cylinder, a piston, a screw by which the piston is carried, slides provided with dogs adapted to engage the thread of the screw, and with lugs, and an oscillatory disk having cam slots engaged by the lugs.

3. A grease gun comprising a cylinder, a piston, a screw by which the piston is carried, slides provided with dogs adapted to engage the thread of the screw and with lugs, and an oscillatory disk having cam slots engaged by the lugs and operating pins extending from said disk.

4. A grease gun comprising a cylinder having at its base a cap with a recess in its inner side and arc slots, a piston, a screw by which the piston is carried, an oscillatory disk lying in the recess and having cam slots and operating pins extending through the arc slots, and slides having lugs engaging the cam slots and dogs adapted to engage the thread of the screw.

5. A grease gun comprising a cylinder having at its base a cap with a recess in its inner side and arc slots, a piston, a screw by which the piston is carried, an oscillatory disk lying in the recess and having cam slots and operating pins extending through the arc slots, slides having lugs engaging the cam slots and dogs adapted to engage the thread of the screw, and a retaining plate secured to the cap and having a transverse recess and slots to receive the slides and dogs.

6. A grease gun comprising a cylinder having at its base a cap with arc slots, a piston, a screw by which the piston is carried and which is provided at its outer end with a cross piece, an oscillatory disk having cam slots and operating pins extending through the arc slots, slides having lugs engaging the cam slots and dogs adapted to be moved into engagement with the thread of the screw by the disk and operating pins, said pins being adapted to be engaged by the cross piece to disconnect the screw when the piston has reached the extreme of its inward movement.

7. A grease gun comprising a cylinder, a piston, a screw by which the piston is carried and which is provided with a cross piece, slides having dogs adapted to engage the thread of the screw and lugs, an oscillatory disk having cam slots engaged by the lugs and operating pins by which the dogs may be moved into engagement with the thread of the screw and which are engaged by the cross piece to disconnect the screw at the end of the forward movement of the piston.

8. A grease gun comprising a cylinder having at its outer end a removable cap and nozzle, a piston, a screw by which the piston is carried, dogs adapted to engage the thread of the screw and means for moving the dogs into and out of engagement, so that when the cap is removed and the dogs are disengaged, cakes of hard grease may be cut out by the end of the cylinder, each cake raising those previously cut out and the piston, and when the cap and nozzle are in place and the dogs engaged the grease may be forced out by rotation of the screw.

In testimony whereof I affix my signature, in presence of two witnesses.

WILLIAM S. STAPLEY.

Witnesses:
ARTHUR H. MOORE,
ISAAC L. FERRIS.